United States Patent [19]

Dorman et al.

[11] Patent Number: 4,525,495

[45] Date of Patent: Jun. 25, 1985

[54] MINERAL FILLED COMPOSITES

[75] Inventors: Linneaus C. Dorman; Paul A. Meyers, both of Midland, Mich.

[73] Assignee: The Dow Chemical Company, Midland, Mich.

[21] Appl. No.: 516,081

[22] Filed: Jul. 22, 1983

[51] Int. Cl.$^3$ ............................................. C08K 3/34
[52] U.S. Cl. ..................... 523/205; 523/209; 524/456; 524/606; 524/790; 524/791; 524/850; 524/879
[58] Field of Search ............... 523/205, 209; 524/790, 524/791, 879, 850, 606, 456; 526/258; 528/292, 528/328, 271

[56] References Cited

U.S. PATENT DOCUMENTS

| | | | |
|---|---|---|---|
| Re. 28,646 | 12/1975 | Hedrick et al. | 524/606 |
| 2,534,283 | 12/1950 | MacDonald | 528/271 |
| 2,644,808 | 7/1953 | Brubaker et al. | 528/328 |
| 3,230,274 | 1/1965 | Garber et al. | 528/328 |
| 3,387,070 | 6/1968 | Wakasa et al. | 528/328 |
| 3,585,161 | 6/1971 | Akamatsu et al. | 528/328 |
| 3,635,909 | 1/1972 | Fujimoto et al. | 528/328 |
| 4,178,686 | 12/1979 | Riess et al. | 3/1.9 |
| 4,192,021 | 3/1980 | Deibig et al. | 3/1.9 |
| 4,222,128 | 9/1980 | Tomonaga et al. | 3/1.9 |
| 4,263,185 | 4/1981 | Belykh et al. | 525/178 |
| 4,291,013 | 9/1981 | Wahlig et al. | 424/16 |
| 4,362,842 | 12/1982 | Masuhara et al. | 524/854 |

FOREIGN PATENT DOCUMENTS 2031450 4/1980 United Kingdom .
1593288 7/1981 United Kingdom .

OTHER PUBLICATIONS

Chem. Abstracts, 88, 1708380, (1978).
Chem. Abstracts, 91, 175714s, (1979).
Advances in Colloid and Interface Science, 13, pp. 65–99, (1980).
Derwent Abstract A96, Veterinary, Medical, Dental; p. 121; week E32, J5 7106-609 & 7106-614; p. 122, J5 7108-010.
On-line Abstract of German 2,620,890.

*Primary Examiner*—Lewis T. Jacobs
*Attorney, Agent, or Firm*—Edward P. Gray; Kenneth L. Loertscher

[57] ABSTRACT

The present invention is directed to mineral filled α-amino acid polymer composite materials. The composite materials are prepared by the in situ polymerization of an α-amino acid N-carboxyanhydride in the presence of mineral fillers which are optionally surface-modified with a partially hydrolyzed polyoxazoline prior to said polymerization. Composite materials prepared in this manner consist of an intimate mixture of polymer and mineral filler which may be optionally blended with a crosslinking agent and then molded to produce smooth, hard homogeneous materials that are water and oil resistant and have good heat distortion properties.

40 Claims, No Drawings

MINERAL FILLED COMPOSITES

BACKGROUND OF THE INVENTION

1. Field of the Invention

The present invention relates to mineral filled α-amino acid polymer composite materials prepared by the polymerization of an α-amino acid in the presence of inorganic mineral fillers. Said fillers may be optionally surface-modified with a partially hydrolyzed polyoxazoline prior to said polymerization.

2. Description of Pertinent Art

Laible and Hamann (*Advances in Colloid and Interface Science*, 13, 65–99, 1980) teach the anionic polymerization of N-carboxy-α-amino acid anhydrides initiated by surface-modified silica. Said modification of the silica involves a multiple step procedure for converting the surface hydroxyl groups of silica to aminophenyl groups which are chemically bound to the silica surface via silicon-carbon bonds. In this procedure, the surface hydroxyl groups of silica are first converted to chlorosilyl groups by chlorination of the silica with thionyl chloride. The chlorinated silica is then phenylated by treatment with phenyllithium in a diethylether solution. The phenyl groups are subsequently nitrated by the use of acetyl nitrate, and the nitrophenyl groups are reduced by treatment with hydrazinium hydrate in ethylene glycol solution, thus creating aminophenyl groups chemically bound to the silica surface by silicon-carbon bonds. The polyamide grafted silicas are said to be useful in the stabilization of colloidal dispersions to flocculation.

Oya, Takahashi and Sunaga (Chem. Abs. 88, 170838p, 1978) describe polymer blends prepared by the polymerization of an α-amino acid N-carboxyanhydride in a solution of a thermoplastic in a solvent (e.g., polyvinyl chloride in tetrahydrofuran).

Ebihara and Okada (Chem. Abs. 91, 175714s, 1979) teach the use of glycyl styrene resin in methylene chloride at room temperature for buildup of poly(γ-methyl L-glutamate) chains on the resin particle using the amino group of the bound glycine as an initiation or graft site in the presence of γ-methyl L-glutamate N-carboxyanhydride. Subsequently, the poly(γ-methyl L-glutamate) chains are cleaved with hydrofluoric acid (cleaving the γ-methyl ester group) to produce poly(L-glutamic) acid.

Avry et al (*Eur. Polymer J.*, 2, 355, 1966) describe the grafting of poly(α-amino acid)polymers to polysaccharides utilizing the $O^-Na^+$ form of the polysaccharide to initiate polymerization of an α-amino acid N-carboxyanhydride.

SUMMARY OF THE INVENTION

The present invention is directed to a composition of matter comprising a composite material of an α-amino acid polymer and an inorganic mineral filler. This composite material may be blended with a crosslinking agent as described herein and subsequently molded into forms. The invention further relates to a process for preparing the composite materials by the in situ polymerization of the corresponding reactive monomer of the α-amino acid (i.e., the α-amino acid N-carboxyanhydride) and the inorganic mineral filler when the two components are admixed in a suitable solvent vehicle. Prior to said polymerization, the inorganic mineral filler, depending on the type utilized, may be surface-modified with a partially hydrolyzed polyoxazoline such as partially hydrolyzed poly(2-ethyl-2-oxazoline). Such surface modification serves to improve adhesion of the α-amino acid polymer matrix to the filler surface and may also serve as a polymerization initiator. The composite materials prepared by the in situ polymerization may then be blended with a crosslinking agent in order to improve the tensile properties of the subsequently molded material.

The molded objects prepared from the composite materials of the present invention are smooth, hard, and homogeneous and may be used in a wide variety of engineering applications such as where a material is required which is oil and water resistant and possesses good compressive strength and heat distortion properties (i.e., in gears, bearings, load-bearing supports, and the like). Further, inasmuch as the composite materials described herein contain an α-amino acid polymer, they are biodegradable and can form the basis for a sustained-release matrix which can be used in various agricultural applications such as for the gradual release of herbicides, pesticides, insecticides and the like over a pre-determined period of time. Being ceramic-like in appearance, the molded composites may also be used as decorative pieces or as common household articles for which good heat resistance is necessary (for example in warming trays, coasters, housings and/or bases for electrical cookware and so on).

DETAILED DESCRIPTION OF THE INVENTION

The α-amino acids utilized in the preparation of the composite materials of the present invention may be any of the common, naturally occurring or synthetic α-amino acids capable of undergoing polymerization through the corresponding reactive α-amino acid N-carboxyanhydride monomer (for convenience, hereinafter referred to as α-amino acid NCA).

Examples of the α-amino acids which may be utilized include compounds such as aspartic acid, glutamic acid, lysine, arginine, alanine, valine, leucine, serine and the like. The α-amino acids used herein may be present in the D or L configuration or in the D,L configuration. Preferred are those α-amino acids exhibiting the L configuration.

Prior to the preparation of the reactive α-amino acid NCA monomer, it is necessary to insure that during the ensuing α-amino acid NCA polymerization no side chain reactions or interactions between amino and carboxyl functions of different amino acids occur. Such situations may be prevented by carrying out the reaction in such a way as to avoid said interactions or by utilizing α-amino acids wherein protecting groups have been added to the side chain, amino and/or carboxyl functions. Amino acids having such protected functionalities are readily prepared by known techniques or are commercially available. See for example, the following publications (which, along with all other references alluded to herein, are incorporated by reference): *Solid Phase Peptide Synthesis*, J. Stewart and J. Young, 1969; *Synthetic Peptides*, G. Pettit, Vol. 1 (1970) and Vol. 2 (1971); and *The Peptides, Analysis, Synthesis, Biology*, E. Gross and J. Meienhofer, 1979, and references cited in each.

Of the α-amino acids which may be utilized in the present invention, glutamic acid is preferred. Glutamic acid may be polymerized by known techniques without the addition of the above-described protecting groups, or derivatives of glutamic acid may be used. Especially preferred for use herein are the derivatives of glutamic acid having a γ-ester residue of the formula:

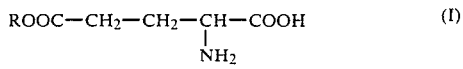 (I)

wherein R represents alkyl or aralkyl. As used herein, the term "alkyl" refers to aliphatic, straight or branched chain radicals of from about 1 to about 6 carbon atoms or cyclic aliphatic radicals of from about 3 to about 6 carbon atoms; "aralkyl" refers to radicals such as, for example, phenylethyl, benzyl, ring-substituted benzyl and the like. Most particularly preferred for use herein are those compounds of formula I wherein R is methyl or benzyl.

The α-amino acid NCA referred to above is prepared by the reaction of the desired α-amino acid with phosgene via procedures known to the art. See, for example, U.S. Pat. No. 3,658,831, and Fuller et al., "A Procedure for the Facile Synthesis of Amino-Acid N-Carboxyanhydrides" (*Biopolymers*, Vol. 15, p. 1869, 1976) which are incorporated herein by reference. For purposes of illustration, the N-carboxyanhydride of a compound of formula I is prepared by the following reaction sequence (where R is as defined for formula I):

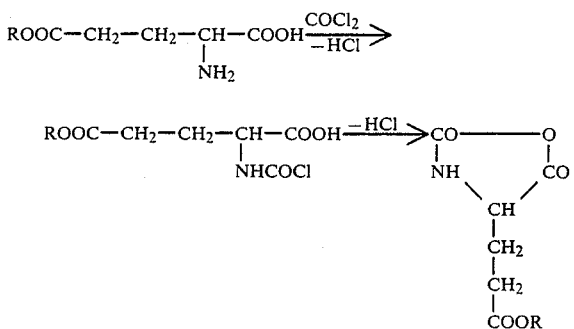

The α-amino acid NCA is then readily polymerized into the α-amino acid polymer as represented by the following sequence:

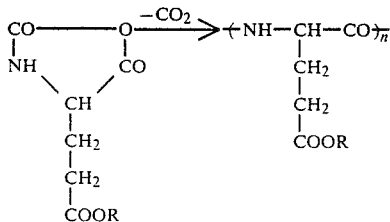

wherein R is as defined for formula I and n is a positive integer. The other α-amino acid polymers alluded to herein may be prepared in a manner analogous to the above-described reactions; the use of compounds of formula I depicted therein is merely illustrative. Further, one skilled in the art will appreciate that α-amino acid polymers may be prepared by techniques other than as described herein (i.e., by methods other than polymerization of an α-amino acid NCA monomer) such as by solid phase synthesis, the use of a symmetrical anhydride or triphenylphosphite with imidazole and the like.

The desired α-amino acid NCA is polymerized in the presence of one or more inorganic mineral fillers such as, for example, mica, fumed or amorphous silica, wollastonite and the like. The composite material thus formed may contain from about 25 to about 75 percent by weight, preferably from about 40 to about 60 percent by weight of inorganic mineral filler, said mineral filler preferably being fumed silica or wollastonite. As described herein, the desired inorganic mineral filler selected for a particular composite material may optionally be surface-modified (alternatively referred to as surface-treated) with a partially hydrolyzed polyoxazoline prior to polymerization with the α-amino acid NCA. Such surface modification serves to enhance the grafting of the α-amino acid polymer matrix to the inorganic mineral filler and, due to the increased basicity of the surface-modified filler, acts as an initiator for the in situ polymerization.

If desired, the tensile strength of the subsequently molded mineral filled α-amino acid polymer composite material may be improved by crosslinking said composite material with from about 1 to about 15 percent by weight (based on the total weight of the composite material plus crosslinking agent) of an amine-containing crosslinking agent. Preferably, the composite material is crosslinked with from about 5 to about 10 percent by weight of an amine-containing crosslinking agent (based on total weight of the composite material plus crosslinking agent).

It is contemplated that the composite materials described herein may be prepared from various combinations of α-amino acids polymerized with one or more inorganic mineral fillers having been, if necessary, previously surface-modified as described herein. By so doing, the physical characteristics of the resulting composite materials may be varied, thus allowing one skilled in the art to design a given composite for highly specific applications. The composite materials of the present invention may be ground to fine, free-flowing powders making them convenient to use, being readily molded (either individually or in various combinations) to virtually any desired shape.

In the preparation of the composite materials of the present invention, the desired α-amino acid having, if necessary, protected side chain, amino and/or carboxyl functionalities is treated with phosgene to form the reactive α-amino acid NCA monomer. While various phosgenation processes are known to the art, it is preferable that a process substantially the same as that described in U.S. Pat. No. 3,658,831 be utilized in order to prepare an α-amino acid NCA of the desired purity. It is important to obtain very highly pure α-amino acid NCA in order to prepare α-amino acid polymers having a high degree of polymerization and high quality.

As indicated earlier, it may be necessary or desirable to treat the inorganic mineral filler utilized in said polymerization with a surface-modifying agent in order to improve adhesion of the α-amino acid polymer to the filler surface and/or to initiate polymerization of the α-amino acid NCA. Some mineral fillers which have sufficiently basic surface charges or impart a basic pH in aqueous solutions can initiate NCA polymerization without surface modification although these polymerizations may tend to proceed more slowly and incompletely as compared to surface-modified fillers when used in approximately the same proportions. Consequently, for purposes of the present invention it is preferred that the inorganic mineral filler utilized herein be treated with a surface-modifying agent prior to polymerization. Compounds useful as surface-modifying agents are partially hydrolyzed polyoxazolines and is preferably partially hydrolyzed poly(2-ethyl-2-oxazoline), hereinafter alternatively referred to as PHPEOX. As used herein, partially hydrolyzed poly(2-ethyl-2-oxazoline) or PHPEOX refers to an aqueous solution of about 20 percent poly(2-ethyl-2-oxazoline) which is about 14 percent hydrolyzed. For these purposes, the partially hydrolyzed polyoxazoline is used in an amount sufficient to improve adhesion of the inorganic mineral filler to the α-amino acid polymer matrix and/or initiate polymerization of the α-amino acid NCA. The amount utilized may be readily determined by one skilled in the art based on considerations such as the amount and surface area of the mineral filler being used, the type of mineral filler being used and the like. The treatment is conveniently carried out by contacting the inorganic mineral filler with the partially hydrolyzed polyoxazoline in a suitable solvent for a time sufficient to effect surface modification of the inorganic filler material (typically from about 6 to about 12 hours). Said surface-modified filler material may then be collected by conventional techniques such as centrifugation, filtration and the like. It should be noted that virtually any primary, secondary, or tertiary amine-containing agent may be used to effect surface modification as described above. However, the use of partially hydrolyzed poly(2-ethyl-2-oxazoline) as characterized herein is preferred.

The composite material is prepared by blending the α-amino acid NCA with the desired inorganic mineral filler (preferably having been previously surface-modified as described above) in a suitable inert organic solvent such as dioxane, tetrahydrofuran (THF), methylene chloride or mixtures thereof. As noted earlier, the composite material may be composed of from about 25 to about 75 percent by weight, preferably from about 40 to about 60 percent by weight of one or more inorganic mineral fillers, preferably wollastonite or fumed silica. Correspondingly, the α-amino acid polymer represents from about 75 to about 25 percent by weight, preferably from about 60 to about 40 percent by weight of the composite formed. Typically, the α-amino acid NCA and inorganic mineral filler are stirred for a period of time sufficient to effect formation of the desired composite material (usually from about 2 to about 16 days) at a temperature of from about 18° to about 30° C. It is preferred that the mixture be stirred for about 4 to about 10 days at about 25° C., at normal atmospheric pressure (i.e., 760 mm Hg).

The mineral filled α-amino acid polymer composite material formed may optionally be crosslinked with from about 1 to about 15 percent by weight (based on the total weight of the composite material plus crosslinking agent), preferably from about 5 to about 10 percent by weight (based on the total weight of the composite material plus crosslinking agent) of an amine-containing crosslinking agent. Such crosslinking improves the tensile strength of the subsequently molded composite materials and may be achieved through the use of various diamides, amino alcohols, aromatic diamines or polyamine carbamates such as N-(2-aminoethyl)piperazine carbamate, 1,3-bis(aminomethyl)cyclohexane, methylene bis(4-aminocyclohexane) and the like. Preferably, the amine-containing crosslinking agent is N-(2-aminoethyl)piperazine carbamate:

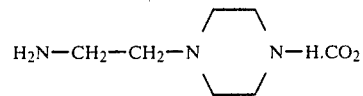

The desired amount of the mineral filled α-amino acid polymer composite material is conveniently blended with the amine-containing crosslinking agent by conventional techniques such as tumbling the mixture on a roller for a time sufficient to achieve adequate dispersion (usually about one to about two hours). The resulting blends may then be molded into the desired forms by techniques wellknown to the art.

Notably, certain advantages to the in situ polymerization process described herein may be appreciated when the α-amino acid NCA is blended with a mineral filler having been previously surface-modified with PHPEOX. Blending of the α-amino acid NCA and the PHPEOX surface-modified mineral filler to a homogeneous mixture is facilitated as compared to the mechanical or solvent blending of mineral and pre-formed polymer. Further, the blending process serves to initiate polymerization of the α-amino acid NCA due to the presence of the PHPEOX on the inorganic mineral filler. The in situ formed polymer prepared by this process becomes substantially grafted to the PHPEOX surface-modified mineral filler, thus improving adhesion. The process is not energy intensive, inasmuch as no external catalysis such as heating or cooling is required. After the composite material has been prepared by the in situ process described herein, it can be molded under heat and pressure to virtually any desired shape with little or no mold shrinkage while maintaining the integrity of the matrix polymer with the inorganic mineral filler.

The following examples are provided as a means of illustrating the present invention and are not to be construed as a limitation thereon.

EXAMPLE 1

γ-Benzyl L-Glutamate 1416 grams (g) of L-glutamic acid, 1560 g of 60% sulfuric acid and 1152 g of benzyl alcohol were placed in a 12 liter round bottom flask equipped with a distillation head. The mixture was heated to 70° C. and stirred for 45 minutes. Upon cooling, the resulting solution was stirred and was subjected to a reduced pressure. When the vacuum had stabilized at about 100 millimeters (mm) the reaction temperature was again raised to 70° C. and water was distilled off for about 4.5 hours. Upon standing overnight, the reaction mixture became viscous and was slowly added to a stirred mixture of 1613 g of sodium bicarbonate, 1.2 kilograms (kg) of ice and 12 liters of water. A precipitate formed which was collected by filtration and then washed with about 8 liters of carbon dioxide-free water and 8 liters of acetone and subsequently air-dried. The precipitate was triturated with 2 liters of ether and dried, yielding 1044 g of the desired γ-benzyl L-glutamate, melting point (m.p.) 156°–157° C. Thin layer chromatography detected the presence of unreacted glutamic acid in the crude product. The crude product was recrystallized from 12.5 liters of hot water and filtered through a plug of glass wool suspended in the neck of a heated glass funnel. After cooling, and overnight refrigeration, the recrystallized product was collected, and washed with 2 liters of cold water, then 2 liters of THF. The product was air dried overnight and then dried in vacuo at room temperature for three hours. 693 g of γ-benzyl L-glutamate was recovered as white, shiny plates, m.p. 156.5°–157° C.

Following a procedure substantially the same as that described in Example 1, the following two compounds were prepared.

EXAMPLE 2

γ-Benzyl D,L-Glutamate, m.p. 145°–146° C.

EXAMPLE 3

γ-Hexyl L-Glutamate, m.p. 162.5°–163° C.

EXAMPLE 4

γ-Methyl L-Glutamate

A cold solution of 300 milliliters (ml) of acetyl chloride was slowly added to a flask containing 3 liters of methanol. To this mixture was added 442 g of L-glutamic acid. The flask was stoppered and shaken for several minutes to effect solution. The flask was then allowed to stand at room temperature with intermittent shaking for 24 hours. 300 ml of pyridine was added causing a precipitate to form. Upon standing for an additional 48 hours, the precipitate was collected on sintered glass and washed with two 600 ml portions of ethanol and a 250 ml portion of ether. The precipitate was dried in vacuo at room temperature for 3 hours and then in a vacuum desiccator over Drierite® for 5 hours. Pyridine vapors were still perceptible from the precipitate which was further triturated with ether and dried again yielding 201.5 g of the desired, γ-methyl L-glutamate as white, shiny plates, m.p. 168°–169° C.

EXAMPLE 5

γ-Benzyl L-Glutamate N-carboxyanhydride 92.7 g of γ-benzyl L-glutamate and 840 ml of THF were mixed and heated in a 3 liter reaction flask. Nitrogen and phosgene were bubbled in and the reaction temperature was maintained between 45°–50° C. until complete solution of the starting material had occurred (about 2 hours). Heating and phosgene flow were then stopped, but stirring and nitrogen flow were continued as the reaction mixture cooled slowly to 30° C. (approximately 45 minutes). The reaction flask was carefully removed from the phosgenation apparatus and stoppered. The reaction mixture was then concentrated in vacuo to about 250 ml with the aid of a rotary evaporator (maximum bath temperature about 35° C.). The resulting residue was transferred to a dry flask and diluted carefully with an equal volume of hexane and seeded. After allowing crystallization to proceed at room temperature for about an hour, the reaction mixture was further diluted with about 500 ml of hexane and was maintained at −30° C. for about 8–10 hours. After warming to room temperature the product was collected on a sintered glass funnel, care being taken to minimize contact with atmospheric moisture. The product was rinsed with a mixture of THF-hexane (1:3) and then hexane, covered with a filter paper and dried in a vacuum desiccator over Drierite®. 92.6 g of the desired γ-benzyl L-glutamate N-carboxyanhydride was recovered as white crystals, m.p. 95°–96° C.

EXAMPLE 6

γ-Methyl L-Glutamate N-Carboxyanhydride 100 g of γ-methyl L-glutamate and 600 ml of THF were placed in a 2 liter flask under nitrogen. The ensuing phosgenation reaction was carried out as described in Example 5, above. The reaction temperature was maintained between 44°–49° C. for about 3 hours. Heating and phosgene addition were discontinued and stirring of the reaction mixture under nitrogen continued for about 1 hour before working up as described previously. 93.9 g of the desired γ-methyl L-glutamate N-carboxyanhydride was recovered as dense, white crystals, m.p. 97.5°–99° C.

EXAMPLE 7

Surface Treatment of Amorphous Silica with PHPEOX 100 grams of amorphous silica (IMSIL®A-10) was suspended in about 120 ml of water. To this was added 4.20 g of PHPEOX solution (22.6% solids) and about 10 ml of rinse. This mixture was agitated to completely wet the silica and was then allowed to stand overnight. The mixture was centrifuged at about 5000 rpm for 10 minutes and the supernatant was decanted and saved. The silica residue was washed by centrifugation and the resulting supernatant was combined with the first supernatant. The residue was resuspended in water and freeze dried. The resulting soft, solid residue was then milled to give a light gray PHPEOX-treated powder (i.e., amorphous silica surface-modified with PHPEOX), which was further dried over Drierite® and Linde® sieves.

The combined supernatants were freeze dried and titrated with standardized HCl for residual (unadsorbed) PHPEOX. 0.570 g of PHPEOX was adsorbed onto the surface of the amorphous silica.

EXAMPLE 8

Surface Treatment of Mica with PHPEOX

Portions of 100 g each of Suzorite® mica 200-S and Suzorite® mica 325-HK were each wetted with 150–200 ml of water and mixed with 4.63 g of PHPEOX solution in 10 ml of water and allowed to stand overnight. The mixtures were centrifuged for 10 minutes at about 5000 rpm. The supernatants were retained and the residues were washed again by centrifugation and the supernatants were again combined. The mica residues were washed again by centrifugation, dried in air and then in vacuo, milled and further dried over Drierite® and Linde® sieves.

The combined supernatants were freeze dried and titrated with standardized HCl for residual PHPEOX. For the mica grade 200-S, 0.428 g of PHPEOX was adsorbed. For the mica grade 325-HK, 0.408 g of PHPEOX was adsorbed.

EXAMPLE 9

Surface Treatment of Fumed Silica with PHPEOX

A suspension of 39 g of fumed silica (CAB-O-SIL-®EH-5) was surface treated with 3.87 g of PHPEOX solution in 10 ml of water as described in Example 8. 0.849 g of PHPEOX was adsorbed onto the fumed silica.

EXAMPLE 10

Surface Treatment of Wollastonite with PHPEOX 100 g quantities of each of NYAD® wollastonite, grades 325, 400 and G were surface treated with 4.61 g, 4.80 g and 4.68 g respectively of PHPEOX solution and 150 ml of water as described in Example 8. Supernatants were retained, but titration with standardized HCl to determine unadsorbed PHPEOX was obviated by the presence of trace amounts of soluble and/or insoluble wollastonite.

Typical properties of the inorganic mineral fillers utilized herein are set forth in Table I.

filler may be added to the α-amino acid NCA). The resulting mixture was then stirred at room temperature. Polymerization of the α-amino acid NCA was conveniently monitored by IR. About a 25 microliter quantity of the reaction mixture was withdrawn, and the aliquot spread on an IR salt plate under nitrogen and dried to a

TABLE I
TYPICAL PROPERTIES OF MINERAL FILLERS

| Mineral Type | Brand | Grade | Surface Area ($m^2/g$) | Nominal Mesh Size | Aspect Ratio | Bulk Density ($g/cm^3$) | Specific Gravity | pH[a] |
|---|---|---|---|---|---|---|---|---|
| Fumed Silica | Cab-O-Sil ® (Cabot Corp.) | EH-5 | 390 ± 40 | | | 0.037 | 2.2 (approx.) | 3.5–4.2 |
| Wollastonite | NYAD ® (Nyco Corp., div. of Processed Minerals Inc.) | 325 | 1.55[b] | | 5:1 | 1.2 | 2.9 | 9.9 |
| Wollastonite | NYAD ® (Nyco Corp., div. of Processed Minerals Inc.) | 400 | 1.98[b] | | 3:1 | 1.1 | 2.9 | 9.9 |
| Wollastonite | NYAD ® (Nyco Corp., div. of Processed Minerals Inc.) | G | 0.88[b] | | 20:1 | 0.86 | 2.9 | 9.9 |
| Mica | Suzorite ® (Marietta Resources Intl., Ltd.) | 200-S | | −100 | | 0.14–0.19 | 2.74–2.95 | 7.5 |
| Mica | Suzorite ® (Marietta Resources Intl., Ltd.) | 325-HK | | −325 | | 0.14–0.21 | 2.74–2.95 | 7.5 |
| Amorphous Silica | IMSIL ® (Illinois Mineral Co.) | A-10 | 1.46 | | | 0.34–0.37 | 2.65 | 7 |

[a]As determined in an aqueous solution or suspension.
[b]As determined by the BET method.

Preparation of Composite Materials by In Situ Polymerization

Four-ounce bottles were equipped with magnetic stirring bars and fitted with drying tubes supported in tight fitting cork stoppers or screwcaps. The bottles were charged with the desired inorganic mineral filler (having been previously surface-modified if necessary or desired) and a sufficient amount of solvent to disperse the filler with gentle stirring (about 10–20 ml of solvent per 2 g of filler). A solution of the α-amino acid NCA monomer was weighed into a separate glass bottle (in the absence of atmospheric moisture) and was then added to the dispersed filler (alternatively, the dispersed filler may be added to the α-amino acid NCA). The resulting mixture was then stirred at room temperature. Polymerization of the α-amino acid NCA was conveniently monitored by IR. About a 25 microliter quantity of the reaction mixture was withdrawn, and the aliquot spread on an IR salt plate under nitrogen and dried to a residue. An IR spectrum of the residue was then obtained, with polymerization indicated by absence of the characteristic absorptions of the N-carboxyanhydride at about 1790 $cm^{-1}$ and 1860 $cm^{-1}$. In those instances where polymerization had stopped or was proceeding slowly, a minor amount (about one or two drops) of triethylamine ($NEt_3$) was added to facilitate the reaction although this was not always desirable or necessary to complete the polymerization. The composite material thus obtained was collected by filtration and washed with a suitable solvent, typically methanol, ethanol or an ethanol/ether mixture (7:3).

Composite materials prepared by this method are summarized in Tables II and III.

TABLE II
Preparation of Composites of Mineral Fillers and In Situ Formed Poly (γ-Benzyl L-Glutamate)

| | γ-Benzyl L-Glutamate N—Carboxyanhydride | | Mineral Filler | | | Reaction | Composite Product | |
|---|---|---|---|---|---|---|---|---|
| Example Number | Wt. (g) | Theoret. Polymer Wt (g) | Type | Surface Treatment | Wt. (g) | Time (days) | Filler Content[g] % (wt) | Physical Appearance of Solid Products |
| 11 | 2.40 | 2.0 | Amorphous silica[a] | None[e] | 2.00 | 15 | 53.6 | Beige, fiber-like, matted |
| 12 | 2.40 | 2.0 | Amorphous silica[a] | PHPEOX[f] | 2.00 | 15 | 50.9 | Gray, denser, slightly fibrous |
| 13 | 2.56 | 2.13 | Mica 200-S[b] | PHPEOX[f] | 2.00 | 6 | 49.0 | Tan, matted fiber |
| 14 | 2.18 | 1.81 | Mica 325-HK[b] | PHPEOX[f] | 2.00 | 6 | 53.1 | Tan, matted fiber |
| 15 | 2.03 | 1.69 | Fumed silica EH-5[c] | PHPEOX | 2.00 | 6 | 52.5 | White, short fibers |
| 16 | 2.81 | 2.34 | Wollastonite 325[d] | PHPEOX[f] | 2.34 | 14 | 51.0 | White, thick fibers |
| 17 | 2.71 | 2.26 | Wollastonite 400[d] | PHPEOX | 2.26 | 14 | 50.7 | White, thick fibers |
| 18 | 2.67 | 2.22 | Wollastonite G[d] | PHPEOX[f] | 2.22 | 14 | 52.1 | Pale gray, thick fibers |
| 19 | 3.31 | 2.76 | Mica 325-HK[b] | None[f] | 2.76 | 8 | 57 | Tan, hard solid |

[a]IMSIL ® A-10
[b]Suzorite ®
[c]Cab-O-Sil ®
[d]NYAD ®
[e]NEt₃ initiator used at about [M]/[I] = 40 (where [M] and [I] refer to the molar concentration of γ-benzyl L-Glutamate NCA monomer and the molar concentration of initiator, respectively)
[f]NEt₃ added to complete polymerization
[g]Assumes no mechanical loss of filler

TABLE III

Preparation of Composites of Mineral Fillers and In Situ Formed Poly (γ-Methyl L-Glutamate)

| | γ-Methyl L-Glutamate N—Carboxyanhydride | | Mineral Filler | | | Reaction | Composite Product | |
|---|---|---|---|---|---|---|---|---|
| Example Number | Wt. (g) | Theoret. Polymer Wt (g) | Type | Surface Treatment | Wt. (g) | Time (days) | Filler Content[f] % (wt) | Physical Appearance of Solid Products |
| 20 | 2.40 | 1.84 | Mica 200-S[a] | PHPEOX[e] | 2.00 | 6 | 53.8 | Brown, slightly spongy solid |
| 21 | 2.02 | 1.55 | Mica 325-HK[a] | PHPEOX[e] | 1.68 | 6 | 53.3 | Tan, denser solid |
| 22 | 2.33 | 1.78 | Fumed silica EH-5[b] | PHPEOX | 1.94 | 6 | 52.6 | White solid |
| 23 | 2.34 | 1.79 | Amorphous silica A-10[c] | PHPEOX[e] | 1.95 | 6 | 55.1 | Dull gray solid |
| 24 | 2.77 | 2.12 | Wollastonite 325[d] | PHPEOX | 2.12 | 12 | 51.1 | White, relatively dense solid |
| 25 | 2.49 | 1.91 | Wollastonite 400[d] | PHPEOX | 1.91 | 12 | 51.3 | White, relatively dense solid |
| 26 | 2.87 | 2.20 | Wollanstonite G[d] | PHPEOX | 2.20 | 12 | 51.4 | Pale gray, relatively less dense solid |
| 27 | 5.45 | 4.17 | Fumed silica EH-5[b] | PHPEOX[e] | 0.46 | 12 | 10.0 | White, non-homogeneous[g] |
| 28 | 5.11 | 3.91 | Fumed silica EH-5[b] | PHPEOX | 1.30 | 12 | 25.8 | White, hard homogeneous solid |
| 29 | 3.51 | 2.69 | Fumed silica EH-5[b] | PHPEOX | 1.79 | 12 | 40.9 | White, hard homogeneous solid |
| 30 | 2.51 | 1.92 | Fumed silica-EH-5[b] | PHPEOX | 2.34 | 12 | 55.7 | White, hard homogeneous solid |
| 31 | 2.55 | 1.95 | Fumed silica EH-5[b] | PHPEOX | 4.55 | 12 | 70.0 | White, hard homogeneous solid |
| 32 | 2.53 | 1.94 | Wollastonite 400[d] | None[e] | 1.94 | 12 | 50 | White, softer homogeneous solid |
| 33 | 2.08 | 1.59 | Mica 325-HK[a] | None[e] | 1.59 | 12 | 50.0 | Light brown, short matted fibers |

[a] Suzorite ®
[b] Cab-O-Sil ®
[c] IMSIL ®
[d] NYAD ®
[e] NEt3 added at late stage in reaction to complete polymerization
[f] Assumes no mechanical loss of filler
[g] Regions of pure polymer observed

EXAMPLE 34

Wollastonite-Poly(γ-methyl L-glutamate) Composite

A 4-ounce bottle equipped with a magnetic stirring bar and fitted with a drying tube was charged with the following reaction mixture: 4.08 g of dried wollastonite (NYAD ®400 grade), 25 ml of a mixture of dioxane-THF (3:1), and a solution of 2.72 g of γ-methyl L-glutamate NCA (equivalent to 2.08 g of polymer) in an additional 25 ml of dioxane-THF mixture. The reaction mixture was then stirred for seven days (IR analysis indicated complete polymerization of the γ-methyl L-glutamate NCA after six days) and then worked up by pouring it into about 250 ml of methanol. The wollastonite-poly(γ-methyl L-glutamate) composite was collected, washed with methanol and dried in vacuo at 70° C. for 8 hours to yield 6.14 g (99.7%) of a white, homogeneous solid which contained 60% wollastonite.

EXAMPLE 35

Wollastonite-Poly(γ-methyl L-glutamate) Composite

A 5-liter flask equipped with a stirring assembly and adapters supporting drying tubes was purged with nitrogen and then charged with the following reaction mixture: 56.0 g of wollastonite (NYAD ®325) previously surface-modified with PHPEOX (as described herein), and a solution of 109.8 g of γ-methyl L-glutamate NCA in 1900 ml of a mixture of dioxane-THF (3:1). The reaction mixture was then stirred at room temperature for 11 days whereupon it was poured into 7 liters of methanol and stirred. The product composite material was collected by filtration, washed with methanol, air dried overnight and then dried in vacuo at 50° C. for 5 hours. There was obtained 130.0 g (92.8%) of wollastonite-poly(γ-methyl L-glutamate) composite (43.1% by weight wollastonite) as a soft, white, homogeneous powder.

EXAMPLE 36

Fumed Silica-Poly(γ-benzyl L-glutamate) Composite

Following a procedure substantially the same as described in Example 35, 40 g of Cab-O-Sil ®EH-5 fumed silica (previously surface-treated with PHPEOX), 51.6 g of γ-benzyl L-glutamate NCA and 1500 ml of a mixture of dioxane-THF (3:1) were stirred at room temperature for 4 days. The reaction mixture was poured into 4 liters of ethanol, and there was obtained (after drying) 80.9 g of fumed silica-poly(γ-benzyl L-glutamate) composite as a fibrous, white solid which was readily crushed into a fine powder. A fumed silica content of 49% (by weight) was confirmed by thermogravimetric analysis.

EXAMPLE 37

Blending of Crosslinking Agents and Mineral Filled Composites

Certain of the mineral filled composite materials prepared were crosslinked with amine-containing crosslinking agents by the following procedure. The desired quantity of the composite material chosen was placed in a plastic jar to which was added a crosslinking agent in the proportions previously stated (i.e., from about 1 to about 15 percent by weight, preferably from about 5 to about 10 percent by weight, based on the total weight of the composite material plus crosslinking agent). Several stainless steel bars (0.5 inch diameter) were placed in the jars and the mixture was then blended by tumbling on a roller for about 2–3 hours. The blended material was then ground, if necessary, and sieved through a 20-mesh screen before molding as described below.

EXAMPLE 38

Compression Molding of Mineral Filled Composites

Mineral filled-poly(γ-benzyl L-glutamate) composite materials were compression molded in nickel plated stainless steel pressurized dies held in a ram press under a 2.5 ton load at about 160° C. One die was cylindrical in shape producing a pressure of about 25,500 pounds per square inch (psi) at the composite surface. Another die was dogbone shaped, producing a pressure of about 2600 psi at the composite surface. Molding time was 20 minutes, with about 10 minutes additional time being allowed for the preheated press and die to approach the desired molding temperature. About 3-3.5 g of the composite material was used to produce a molded, 0.5 inch disc from the cylindrical die. Similarly, about 7-7.5 g of the composite material was used to produce 0.125 inch thick bars from the dogbone shaped die.

The same procedure was repeated utilizing mineral filled-poly(γ-methyl L-glutamate) composite materials. The material was molded in the dies described above under 2.5 ton load at about 220° C.

Physical properties of the compression molded composites are summarized in Tables IV and V. Typical mechanical test data for the molded composites are set forth in Table VI.

TABLE IV

Compression Molded Composites of Poly(γ-Benzyl L-Glutamate)

| Composite Material of Example Number | Molding Temp (°C.) | Color | Molded Product Description | | |
|---|---|---|---|---|---|
| | | | Blending Homogeneity | | |
| | | | Surface | Break Edge | Other |
| 11 | 160 | Beige | Poor | Poor | Poor fusion of particles |
| 12 | 160 | Dark Brown | Good | Good | |
| 13 | 160 | Dark Brown | Good | Good | Smooth, hard |
| 14 | 160 | Tan | Good | Good | Smooth, hard |
| 15 | 160 | White | Excellent | Excellent | Very smooth, marble-like appearance |
| 16 | 160 | Cream White | Fair | Fair | Smooth, marble-like appearance |
| 17 | 160 | Cream White | Good | Good | Smooth |
| 18 | 160 | Gray | Fair | Fair | Smooth, marble-like |
| 19 | 160 | Dark Brown | Good | Good | Smooth, hard |

TABLE V

Compression Molded Composites of Poly(γ-Methyl L-Glutamate)

| Composite Material of Example Number | Molding Temp (°C.) | Color | Molded Product Description | | |
|---|---|---|---|---|---|
| | | | Blending Homogeneity | | |
| | | | Surface | Break Edge | Other |
| 20 | 195 | Tan | Very Good | Very Good | Smooth hard, inflexible |
| 21 | 225 | Brown | Very Good | Very Good | Smooth hard, inflexible |
| 22 | 215 | White | Excellent | Excellent | Very smooth, ivory-like appearance |
| 23 | 225 | Gray | Good | Good | Smooth, hard |
| 24 | 220 | Gray White | Very Good | Very Good | Smooth, very hard, tough |
| 25 | 220 | Gray White | Very Good | Very Good | Smooth, very hard, tough |
| 26 | 220 | Gray White | Good | Good | Smooth, very hard, tough |
| 27 | 215 | Light Yellow | Good | Good | Smooth, translucent, stiff |
| 28 | 215 | Pale Yellow | Very Good | Very Good | Smooth, translucent, stiff |
| 29 | 215 | White | Very Good | Very Good | Very smooth, ivory-like appearance |
| 30 | 215 | White | Very Good | Very Good | Very smooth, ivory-like appearance |
| 31 | 215 | White | Very Good | Very Good | Very smooth, ivory-like appearance |
| 32 | 220 | Gray White | Very Good | Very Good | Smooth, very hard |
| 33 | 225 | Dark Brown | Poor | Fair | Smooth, spotty |

TABLE VI

Mechanical Test Data For Certain Molded Composites[a]

| Composite Material | | | | Crosslinking Agent | | Vicat Heat Distortion (°C.) | Tensile Properties | | | Compressive Strength (psi) |
|---|---|---|---|---|---|---|---|---|---|---|
| Polymer | Wt % | Filler | Wt % | Type | Wt %[b] | | Strength (psi) | Elongation (%) | Modulus (psi × 10^5) | |
| PGBLG | 100 | None | | None | | | 1407 | 10.7 | | |
| PGMLG | 57 | Wollast. | 43 | None | | 250+ | 2193 | 0.5 | 2.6 | 7,932 |
| PGMLG | 57 | Wollast. | 43 | None | | | 2316[c] | 0.5 | 4.7 | |
| PGMLG | 57 | Wollast. | 43 | AEP.CO2 | 6.6 | 221 | 3563 | 0.9 | 4.4 | |
| PGBLG | 51 | FS | 49 | None | | | 975 | 0.9 | 1.0 | 5,282 |
| PGBLG | 51 | FS | 49 | BAMC.CO2 | 4.2 | | 1382 | 1.0 | 1.5 | |
| PGBLG | 51 | FS | 49 | MBAC.CO2 | 5.5 | | 1144 | 0.8 | 1.1 | |

[a] Abbreviations used:
Polymer:
PGBLG = poly(γ-benzyl L-glutamate)
PGMLG = poly(γ-methyl L-glutamate)
Filler:
Wollast. = NYAD ® 325 wollastonite surface-treated with PHPEOX
FS = Cab-O-Sil ® EH-5 fumed silica surface-treated with PHPEOX
Crosslinking Agent:
AEP.CO2 = N—(2-aminoethyl)piperazine carbamate
BAMC.CO2 = 1,3-bis(aminomethyl)cyclohexane carbamate
MBAC.CO2 = methylene bis(4-aminocyclohexane) carbamate
[b] Based on total weight of the composite material plus crosslinking agent
[c] Compression molded under a 10 ton load

What is claimed is:

1. A composite material consisting essentially of from about 25 to about 75 percent by weight of an inorganic mineral filler which has been surface-modified by treatment with a partially hydrolyzed polyoxazoline and from about 75 to about 25 percent by weight of an α-amino acid polymer.

2. The composite material of claim 1 wherein the α-amino acid polymer is a glutamic acid γ-ester polymer and the inorganic mineral filler is wollastonite or fumed silica.

3. The composite material of claim 2 wherein the glutamic acid-γ-ester is glutamic acid-γ-methyl ester and the inorganic mineral filler is wollastonite or fumed silica.

4. The composite material of claim 2 wherein the glutamic acid-γ-ester is glutamic acid-γ-benzyl ester and the inorganic mineral filler is wollastonite or fumed silica.

5. The composite material of claims 2, 3 or 4 wherein the inorganic mineral filler has been surface-modified by treatment with partially hydrolyzed poly(2-ethyl-2-oxazoline).

6. The composite material of claim 1 containing from about 40 to about 60 percent by weight of said inorganic mineral filler.

7. The composite material of claim 5 containing from about 40 to about 60 percent by weight of said inorganic mineral filler.

8. The composite material of claim 1 crosslinked with from about 1 to about 15 percent by weight of an amine-containing crosslinking agent (based on the total weight of the composite material plus crosslinking agent).

9. The composite material of claim 6 crosslinked with from about 1 to about 15 percent by weight of an amine-containing crosslinking agent (based on the total weight of the composite material plus crosslinking agent).

10. The composite material of claim 1 crosslinked with from about 5 to about 10 percent by weight of an amine-containing crosslinking agent (based on the total weight of the composite material plus crosslinking agent).

11. The composite material of claim 7 crosslinked with from about 5 to about 10 percent by weight of an amine-containing crosslinking agent (based on the total weight of the composite material plus crosslinking agent).

12. The composite material of claim 8 wherein the amine-containing crosslinking agent is N-(2-aminoethyl)piperazine carbamate.

13. The composite material of claim 9 wherein the amine-containing crosslinking agent is N-(2-aminoethyl)piperazine carbamate.

14. The composite material of claim 10 wherein the amine-containing crosslinking agent is N-(2-aminoethyl)piperazine carbamate.

15. The composite material of claim 11 wherein the amine-containing crosslinking agent is N-(2-aminoethyl)piperazine carbamate.

16. A process for the preparation of a composite material containing from about 25 to about 75 percent by weight of an inorganic mineral filler which has been surface-modified by treatment with a partially hydrolyzed polyoxazoline and about 75 to about 25 percent by weight of an α-amino acid polymer which comprises polymerizing in situ an N-carboxyanhydride of an α-amino acid in the presence of said inorganic mineral filler in an inert organic solvent.

17. A process for the preparation of a composite material containing from about 40 to about 60 percent by weight of an inorganic mineral filler which has been surface-modified by treatment with a partially hydrolyzed polyoxazoline and about 60 to about 40 percent by weight of an α-amino acid polymer which comprises polymerizing in situ an N-carboxyanhydride of an α-amino acid in the presence of said inorganic mineral filler in an inert organic solvent.

18. The process of claims 16 or 17 wherein said N-carboxyanhydride is glutamic acid N-carboxyanhydride and said inorganic mineral filler is wollastonite or fumed silica.

19. The process of claim 18 wherein said glutamic acid N-carboxyanhydride has a γ-ether residue and said inorganic mineral filler is wollastonite or fumed silica.

20. The process of claim 19 wherein said γ-ester residue is a methyl or benzyl ester of glutamic acid and the inorganic mineral filler is wollastonite or fumed silica.

21. The process of claims 16 or 17 wherein said inorganic mineral filler has been surface-modified by treatment with partially hydrolyzed poly(2-ethyl-2-oxazoline).

22. The process of claims 16 or 17 including the additional step of crosslinking the composite material resulting from said in situ polymerization with from about 1 to about 15 percent by weight of an amine-containing crosslinking agent (based on the total weight of the composite material plus crosslinking agent).

23. The process of claim 22 wherein the composite material resulting from said in situ polymerization is crosslinked with from about 5 to about 10 percent by weight of an amine-containing crosslinking agent (based on the total weight of the composite material plus crosslinking agent).

24. The process of claim 22 wherein said crosslinking agent is N-(2-aminoethyl)piperazine carbamate.

25. The process of claim 23 wherein said crosslinking agent is N-(2-aminoethyl)piperazine carbamate.

26. A composite material consisting essentially of from about 25 to about 75 percent by weight of an inorganic mineral filler and from about 75 to about 25 percent by weight of a glutamic acid-γ-ester polymer.

27. The composite material of claim 26 wherein the inorganic mineral filler is wollastonite.

28. The composite material of claim 27 wherein the glutamic acid-γ-ester is glutamic acid-γ-methyl ester.

29. The composite material of claim 27 wherein the glutamic acid-γ-ester is glutamic acid-γ-benzyl ester.

30. The composite material of claim 28 containing from about 40 to about 60 percent by weight of wollastonite.

31. The composite material of claim 29 containing from about 40 to about 60 percent by weight of wollastonite.

32. The composite material of claim 26 crosslinked with from about 1 to about 15 percent by weight of an amine-containing crosslinking agent (based on the total weight of the composite material plus crosslinking agent).

33. The composite material of claim 28 crosslinked with from about 1 to about 15 percent by weight of an amine-containing crosslinking agent (based on the total weight of the composite material plus crosslinking agent).

34. The composite material of claim 29 crosslinked with from about 1 to about 15 percent by weight of an amine-containing crosslinking agent (based on the total weight of the composite material plus crosslinking agent).

35. The composite material of claim 30 crosslinked with from about 5 to about 10 percent by weight of an amine-containing crosslinking agent (based on the total weight of the composite material plus crosslinking agent).

36. The composite material of claim 31 crosslinked with from about 5 to about 10 percent by weight of an amine-containing crosslinking agent (based on the total weight of the composite material plus crosslinking agent).

37. The composite material of claim 33 wherein the amine-containing crosslinking agent is N-(2-aminoethyl)piperazine carbamate.

38. The composite material of claim 34 wherein the amine-containing crosslinking agent is N-(2-aminoethyl)piperazine carbamate.

39. The composite material of claim 35 wherein the amine-containing crosslinking agent is N-(2-aminoethyl)piperazine carbamate.

40. The composite material of claim 36 wherein the amine-containing crosslinking agent is N-(2-aminoethyl)piperazine carbamate.

* * * * *